Nov. 12, 1968 TARO SUDO ET AL 3,410,965

D.C. SIGNALLING SYSTEM

Filed June 16, 1965 2 Sheets-Sheet 1

INVENTORS.
TARO SUDO
AKIHIRO KITAMURA

BY

Hopgood & Calimafde
ATTORNEYS.

INVENTORS
TARO SUDO
AKIHIRO KITAMURA
BY
Hopgood & Calimafde
ATTORNEYS.

United States Patent Office 3,410,965

Patented Nov. 12, 1968

3,410,965

D.C. SIGNALLING SYSTEM

Taro Sudo and Akihiro Kitamura, Minatoku, Tokyo, Japan, assignors to Nippon Electric Company Limited, Shiba Minatoku, Tokyo, Japan, a corporation of Japan Filed June 16, 1965, Ser. No. 464,444
Claims priority, application Japan, June 20, 1964, 39/35,031
2 Claims. (Cl. 179—84)

This invention relates to an inter-office D.C. signalling system and is particularly adaptable to telephone signally, although it may be employed in any communication system where the basic functional requisites are similar.

Systems such as "CX," "DX," etc. are widely used inter-office long-distance telephone signalling systems employing D.C. signals. Such systems, however, include inherent defects such as the necessity for integrating into such equipment circuitry for compensating for the difference in source voltage between the two offices; the erroneous operation of such signalling equipment at the distant office in case of signalling source failure at the local office; and an appreciably large power consumption of both signalling equipments during their operation.

Accordingly, it is the object of this invention to provide a simple and easily maintained D.C. signalling arrangement which compensates inter-office ground and source potential differences with performance equivalent to the conventional CX and DX signalling systems without significant compensating circuitry.

It is another object of this invention to provide a D.C. signalling system which exhibits nearly distortionless pulse transmission between two offices connected by a single pair line.

It is a further object of this invention to provide a D.C. signalling system which will not erroneously operate distant office signalling equipment upon a power failure at the local office, and which operates with a minimum power consumption.

In order to meet the conditions that simultaneous transmission of signals in both directions may be performed independently and that the signal transmission may be performed regardless of whether or not a source voltage difference and ground potential difference exist between the local and the distant office, the inventive concept employs a combination of three methods as follows:

(1) One of a pair of signalling conductors is assigned to the signal transmission in one direction and the other is assigned to signal transmission in the opposite direction.

(2) In order to provide perfect ground potential compensation, a multi-winding type signal receiving relay is utilized in the signalling equipment installed at each office so that the current flowing in the particular two windings of each signal receiving relay, in the presence of a ground potential difference, may cancel.

(3) The use of mechanically biased signal receiving relays to lessen power consumption of the signalling equipments and prevent erroneous operation at the distant office in case of signalling source failure at the local office.

The above mentioned and other features and objects of this invention and the manner of attaining them will become more apparent and the invention itself will best be understood by reference to the following description of embodiments of the invention taken in conjunction with the accompanying drawings wherein.

Figure 1:
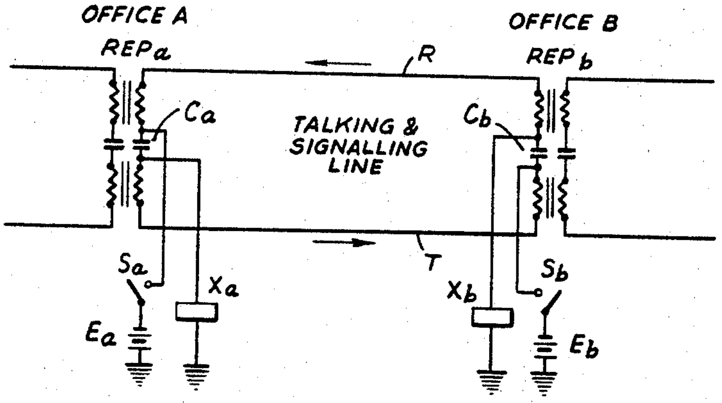
FIG. 1 illustrates schematically a signalling arrangement capable of simultaneous transmission in both directions over a single wire pair irrespective of the difference in the signalling source voltage at the two offices.

FIG. 1 illustrates a circuit configuration for the simultaneous, independent transmission of signals in both directions irrespective of the difference in the signalling source voltage between the two offices. In this figure, as well as in those that follow, the subscripts *a* and *b* have been chosen to represent, respectively, the local and distant office components, and R and T the interconnecting trunk wires for signalling and talking.

Upon closure of contact $S_a$ at office A, a current flows from power source $E_a$ at office A through a loop circuit containing a winding of repeating coil $REP_a$, conductor R, a winding of repeating coil $REP_b$ at office B, relay $X_b$ and ground. In the same manner, upon closure of contact $S_b$ at office B, a current flows through a loop circuit containing $E_b$, another winding of repeating coil $REP_b$, conductor T, another winding of repeating coil $REP_a$, relay $X_a$ and ground. Thus, the two circuits for signal transmission in both directions operate independently, and either office is immune to the effect of the signalling source at the distant office. The signal receiving relays $X_a$ and $X_b$ may be either mechanically or electrically biased.

Figure 2:
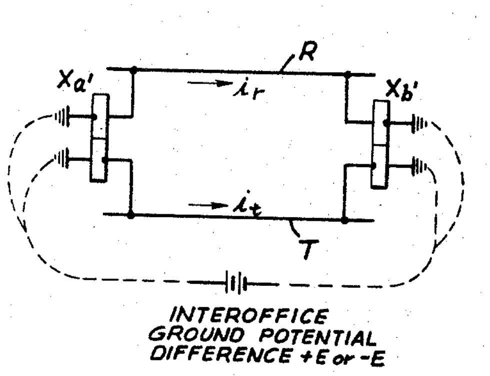
FIG. 2 illustrates schematically a method for compensating inter-office ground potential difference.

FIG. 2 shows a schematic circuit diagram illustrating the principle of compensation for the inter-office ground potential difference. In this figure, each of relays $X_a'$ and $X_b'$ is a dual winding relay in which the two windings are wound in an opposite sense with respect to conductors T and R.

If it is assumed that the currents $i_r$ and $i_t$ flowing in conductors R and T, respectively, are equal in magnitude and that the two windings of each relay are equal in number of turns, then in the presence of the inter-office ground potential difference $+E$ or $-E$, the magnetic fluxes due to exciting the currents $i_r$ and $i_t$ in each relay will cancel and hence, each signal receiving relay will be immune to the effect of the ground potential difference between the two locations.

Figure 3:
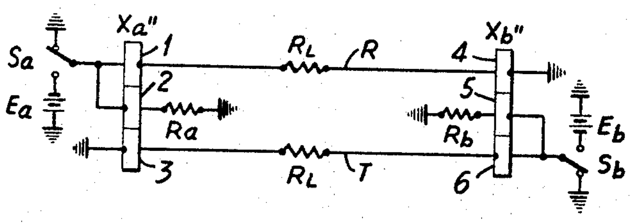
FIG. 3 is an integration of the circuits of FIGS. 1 and 2.

FIG. 3 illustrates a circuit arrangement which integrates the circuitry of FIG. 2 into the circuitry of FIG. 1 by use of the above-mentioned principles. In this figure, $R_L$ denotes the resistance of each of the conductors R and T (assumed the same) and 1 through 3 and 4 through 6 denote the windings of relays $X_a''$ and $X_b''$, respectively. It will be assumed that the number of turns as well as the resistances of windings 1 through 6 are equal.

A close examination of this figure will reveal that the ground potential compensation circuit shown in FIG. 2 has been integrated into this circuit in the form of a combination of windings 1 and 3, and 4 and 6 of relays $X_a''$ and $X_b''$ and that the principles of operation of FIG. 2 are met in the case when either contact $S_a$, $S_b$ or both are closed.

The operation of the circuit of FIG. 3 will now be considered for a case where the signal transmission takes place from office A to office B. Upon closure of contact $S_a$ at office A, two currents are simultaneously generated as follows: One current $i_1$ flows from power source $E_a$, through winding 1 of relay $X_a''$, conductor R, its resistance $R_L$, and winding 4 of relay $X_b''$; the other current $i_2$ flows through winding 2 of relay $X_a''$ and register $R_a$.

Since current $i_1$ energizes winding 4 of relay $X_b''$, an indication of the received signal is obtained. Further, since the windings 1 and 2 of relay $X_a''$ are wound in opposite directions, the exciting ampere-turns cancel provided the following conditions are fulfilled:

$$i_1 = i_2$$

$$R_a = R_L + R_r \text{ (where } R_r \text{ is a winding resistance)}$$

In other words, relay $X_a''$ remains as if it were not energized and the afore-mentioned conditions referring to FIG. 1 are met.

The behavior of the signal transmission from office B to office A is precisely the same, both transmissions taking place independently.

With the described D.C. signalling system, the use of a general-purpose mechanical bias type relay is feasible; power consumption in an idle state (when no signal transmission takes place) is nullified; and the effects on the signalling equipment at the distant office, in case of power source failure at the local office, is eliminated.

Figure 4:
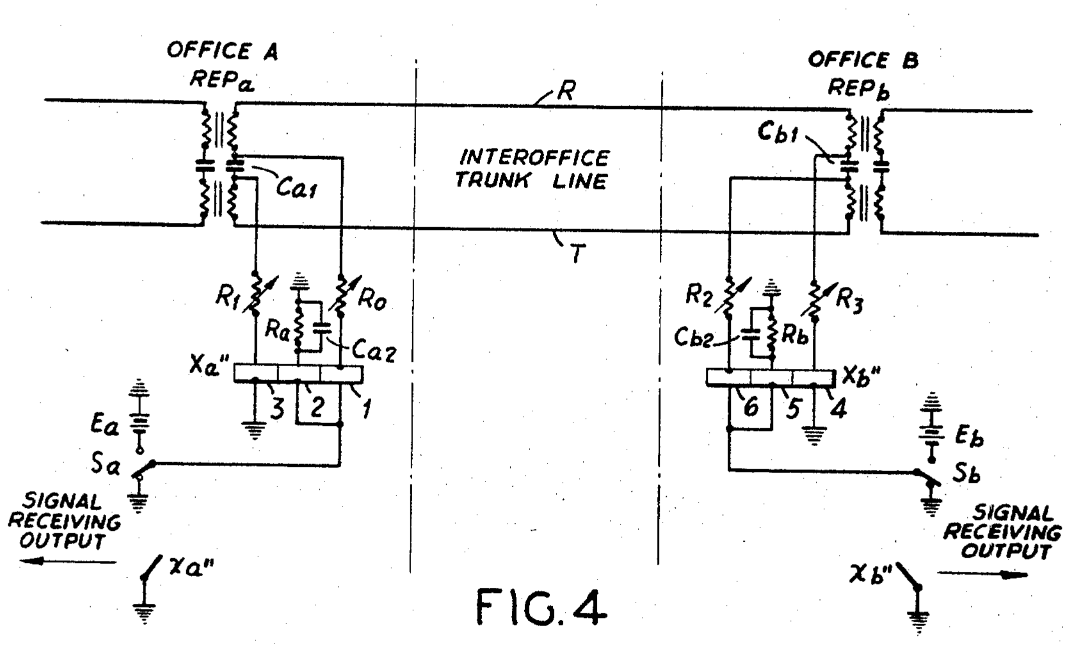
FIGS. 4 and 5 illustrate embodiments of the invention as applied to an inter-office trunk line, with and without repeating coils, respectively.

The invention will now be further clarified with reference to two different embodiment illustrated in the accompanying drawings. FIG. 4 shows a circuit arrangement, for signalling equipment according to this invention, as applied to an inter-office trunk line connected to the telephone switching equipment. In this figure nomenclature similar to FIGS. 1–3 is employed to denote similar elements, and $R_0$, $R_1$, $R_2$ and $R_3$ denote, respectively, adjustable resistors for making the value of current flowing in each of the conductors R and T constant, regardless of the length of the inter-office trunk line. $R_a$ and $R_b$ again indicate resistors for controlling the currents flowing in windings 2 and 5 so as to equate the line currents flowing in windings 1 and 6 respectively, and ensure that the local office relay will not be operated by the current for operating the relay at the distant office. Capacitors $C_{a2}$ and $C_{b2}$ are included to compensate for the effect of the line capacitance plus capacitor $C_{a1}$, and the line capacitance plus capacitor $C_{b1}$, respectively.

When no signal is being transmitted from either office, no current flows in conductors R and T or the windings of relays $X_a''$ and $X_b''$, and accordingly both these relays remain unoperated, their respective contacts $X_a''$ and $X_b''$ remaining open. When, on the other hand, office A initiates a signal transmission, contact $S_a$ operates and the transfer contact is connected from ground to the battery. The resultant potential causes a current to be produced, which flows through a loop circuit containing winding 4 of relay $X_b''$ at the distant office B, resistor $R_3$, a winding of repeating coil $REP_b$, conductor R, a winding of repeating coil $REP_a$, resistor $R_0$, winding 1 of relay $X_a''$ contact $S_a$, and battery $E_a$. Consequently, relay $X_b''$ at the distant office operates and the contact $X_b''$ of relay X operates, thereby providing an indication in the form of ground potential that a signal has been received.

Simultaneous with the production of this current, another current is produced, which flows through a loop circuit containing resistor $R_a$, winding 2 of relay $X_a''$, contact $S_a$, and power source $E_a$. These currents, equal in magnitude and opposite in polarity, flow respectively in windings 1 and 2 of relay $X_a''$ and hence, the excitation applied to one winding is cancelled by that applied to the other; with the result that relay $X_a''$ remains unoperated.

Suppose now that while a signal is being sent from office A, office B has initiated signal transmission. In this case, contact $S_b$ operates and the transfer contact which has been connected to the ground is transferred to the negative terminal of the battery. Thus a current is produced from the battery $E_b$, which flows through a loop circuit containing winding 3 of relay $X_a''$, resistor $R_1$, a winding of repeating coil $REP_a$, conductor T, a winding of repeating coil $REP_b$, resistor $R_2$, winding 6 of relay $X_b''$, contact $S_b$, battery $E_b$, and ground. This causes relay $X_a''$ at office A to operate. The closure of contact $x_a''$ following the operation of relay $X_a''$ provides an indication of signal reception, in the form of ground potential, for the subsequent switching equipment.

Simultaneously with the production of this current, another current is produced, which flows through a loop circuit containing resistor $R_b$, winding 5 of relay $X_b''$; contact $S_b$, battery $E_b$, and ground. Since the currents flowing in windings 5 and 6 are equal in magnitude and opposite in polarity, the excitation applied to each winding is cancelled by the other, with the result that relay $X_b''$ is unaffected by these currents.

Upon the discontinuance of a signal transmission from office A, that is, when the transfer contact of $S_a$ is reconnected to ground, the current flowing from battery $E_a$ through winding 4 of relay $X_b''$ reduces to zero, and hence, relay $X_b''$ releases. Contact $X_b''$ therefore opens and an indication, in the form of the removal of the ground potential, is provided of the discontinuance of signal transmission. A similar indication is given at office A upon the discontinuance of a transmission from office B.

According to this circuit arrangement, perfect compensation for the ground potential difference between offices A and B is feasible, because one of the currents caused by the ground potential difference flows through a loop containing contact $S_a$, winding 1 of relay $X_a''$, resistor $R_0$, a winding of repeating coil $REP_a$, conductor R, a winding of repeating coil $REP_b$, resistor $R_3$, and winding 4 of relay $X_b''$; while the other current flows through winding 3 of relay $X_a''$, resistor $R_1$, another winding of repeating coil $REP_a$, conductor T, another winding of repeating coil $REP_b$, resistor $R_2$, winding 6 of relay $X_b''$ and contact $S_b$. Since the circuit arrangement is symmetrical with respect to conductors R and T, the two currents are equal in value. In other words, two currents flow in such manner that the excitations applied to two windings of each of relays $X_a''$ and $X_b''$ cancel, with the result that both relays are unaffected by these currents caused by the ground potential difference.

Figure 5:
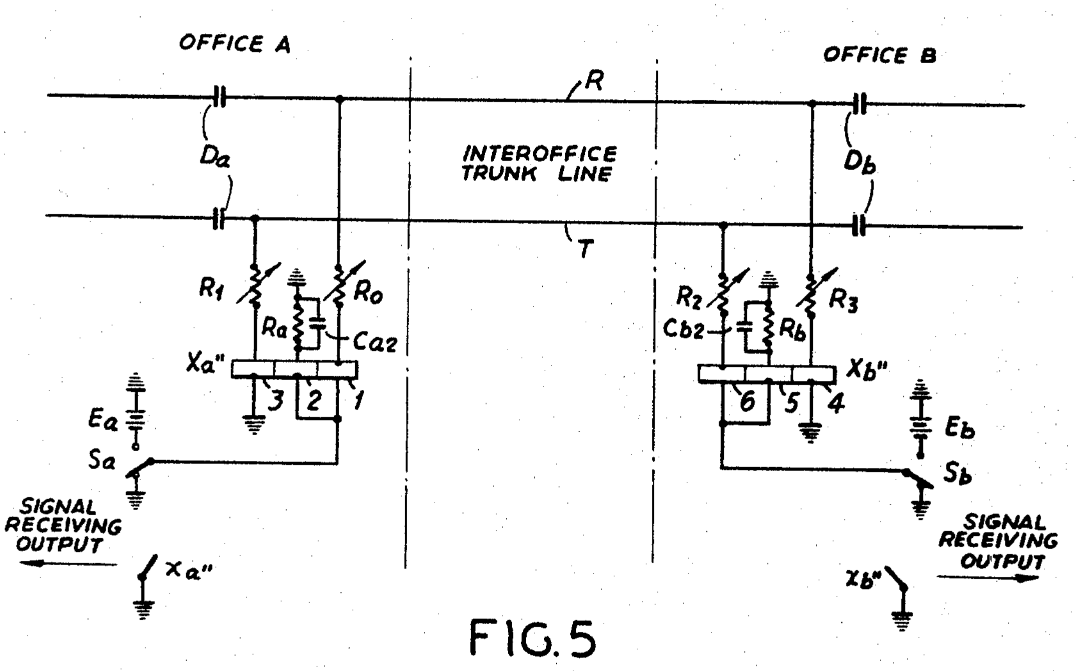

FIG. 5 shows another embodiment of this invention as applied to a telephone line in which DC interruption capacitors $D_a$ and $D_b$ have been connected in lieu of repeating coils $REP_a$ and $REP_b$ and DC interruption capacitors $C_{a1}$ and $C_{b1}$ shown in FIG. 4. In operation, however, this circuit is similar to that of FIG. 4.

In transmitting dialing pulses, etc. with the circuitry of FIG. 4 or FIG. 5, it is possible to nullify signal distortion by adding separate electrical biasing ampere-turns to both relays $X_a''$ and $X_b''$ and suitably adjusting the value of the bias current.

While we have described above the principles of our invention in connection with specific apparatus, it is to be clearly understood that this description is made only by way of example and not as a limitation to the scope of my invention as set forth in the objects thereof and in the accompanying claims. For example, while the principles of this invention have been described as applied to signalling equipment used in an inter-office trunk line connected to two telephone offices in the presence of a difference in the signalling source voltages and the ground potential, the invention is equally applicable to signalling equipments installed at two terminals of any type communication equipment in the presence of the same conditions as mentioned previously.

We claim:

1. A two-way D.C. signalling arrangement in combination with a wire pair comprising at each of the local and distant signalling points: a D.C. source having one terminal coupled to ground; means switchable between the other terminal of said source and ground; a relay having three windings, the first winding being coupled at one end thereof to said means and at the other end to a first one of said wire pair, the second winding being coupled at one end thereof to said means and at the other end to ground, each of said first and second windings being opposite in flux polarity to each other, and the third winding being coupled at one end thereof to ground and at the other end to the second one of said wire pair and being opposite in flux polarity to said first winding.

2. A two-way D.C. signalling arrangement claimed in claim 1 in which the other end of said second winding is connected to ground through a resistor.

No references cited.

KATHLEEN H. CLAFFY, *Primary Examiner.*

R. LINN, *Assistant Examiner.*